US012565214B2

(12) United States Patent
Ryu

(10) Patent No.: US 12,565,214 B2
(45) Date of Patent: Mar. 3, 2026

(54) APPARATUS AND METHOD FOR ESTIMATING STEERING ANGLE BASED ON DIFFERENTIAL BRAKING, AND COMPUTER-READABLE STORAGE MEDIUM STORING PROGRAM FOR PERFORMING THE METHOD

(71) Applicant: HL MANDO CORPORATION, Gyeonggi-do (KR)

(72) Inventor: Jeonghwan Ryu, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 19 days.

(21) Appl. No.: 18/759,256

(22) Filed: Jun. 28, 2024

(65) Prior Publication Data
US 2025/0002020 A1 Jan. 2, 2025

(30) Foreign Application Priority Data

Jun. 29, 2023 (KR) ........................ 10-2023-0084153
Jan. 4, 2024 (KR) ........................ 10-2024-0001603

(51) Int. Cl.
*B60W 30/18* (2012.01)
*B60W 10/184* (2012.01)
*B60W 10/20* (2006.01)

(52) U.S. Cl.
CPC .... *B60W 30/18145* (2013.01); *B60W 10/184* (2013.01); *B60W 10/20* (2013.01); *B60W 2510/182* (2013.01); *B60W 2510/20* (2013.01)

(58) Field of Classification Search
CPC ......... B60W 30/18145; B60W 10/184; B60W 10/20; B60W 2510/182; B60W 2510/20;
(Continued)

(56) References Cited

U.S. PATENT DOCUMENTS

2020/0010087 A1* 1/2020 Akatsuka ............... B60W 50/10
2024/0001914 A1* 1/2024 Do ......................... B60W 30/09

FOREIGN PATENT DOCUMENTS

| JP | 2012-240455 | 12/2012 |
|---|---|---|
| KR | 10-1229126 | 2/2013 |
| KR | 10-2023-0071550 | 5/2023 |

OTHER PUBLICATIONS

Office Action dated Nov. 24, 2025 for Korean Patent Application No. 10-2024-0001603 and its English translation from Global Dossier.

* cited by examiner

*Primary Examiner* — Yi-Kai Wang
(74) *Attorney, Agent, or Firm* — WOMBLE BOND DICKINSON (US) LLP

(57) ABSTRACT

An apparatus and method, and a non-transitory computer-readable storage medium storing a program for performing the method estimates a steering angle based on differential braking. The apparatus may include a memory configured to store an estimation model having at least one coefficient and defining the relationship between a differential braking force of a vehicle and a steering angle of free-rolling front wheels of the vehicle; and a processor configured to input test data comprising a plurality of differential braking forces and steering angles generated when the plurality of differential braking forces are applied to the estimation model, respectively, and determine the at least one coefficient of the estimation model.

17 Claims, 4 Drawing Sheets

S10

Store, by a memory, estimation model —S11

Input, by a processor, test data to estimation model and determine coefficient of estimation model —S12

(58) Field of Classification Search
CPC ........................ B60W 2540/18; B62D 15/021;
B62D 15/024
USPC ......................................................... 701/42
See application file for complete search history.

10

100

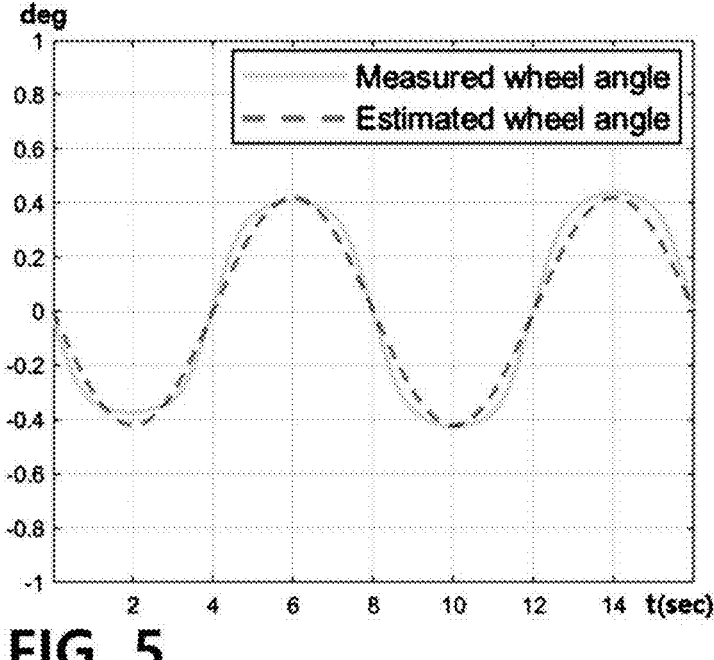
FIG. 5
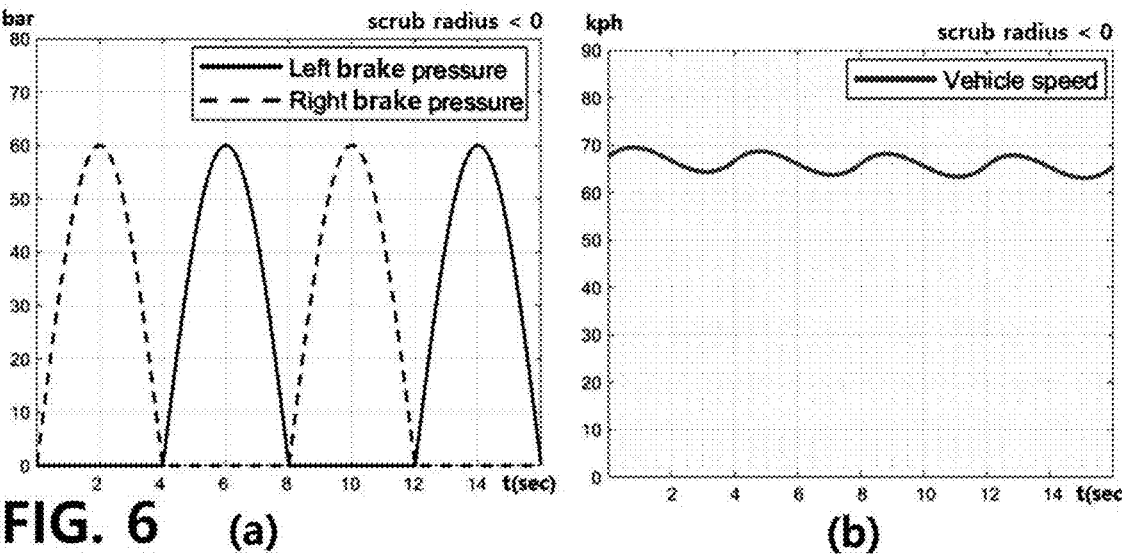
FIG. 6    (a)                                        (b)

S10

1

APPARATUS AND METHOD FOR ESTIMATING STEERING ANGLE BASED ON DIFFERENTIAL BRAKING, AND COMPUTER-READABLE STORAGE MEDIUM STORING PROGRAM FOR PERFORMING THE METHOD

CROSS-REFERENCE TO RELATED APPLICATIONS

This application claims priority to and benefit from Korean Patent Applications No. 10-2024-0001603, filed on Jan. 4, 2024, and Korean Patent Application No. 10-2023-0084153, filed on Jun. 29, 2023, the disclosures of which are incorporated herein by reference in their entireties.

BACKGROUND

1. Technical Field

The present disclosure generally relates to an apparatus and method for estimating a steering angle based on differential braking, and a non-transitory computer-readable storage medium storing a program for performing the method, and more particularly, to an apparatus and method for estimating a steering angle based on differential braking that can be used to implement a differential braking control to respond to a failure of a vehicle's steering system, and a non-transitory computer-readable storage medium storing a program for performing the method.

2. Discussion of Related Art

Recently, vehicles are changing into a driver's personal mobility space, not just a means of transportation, and various future technologies have been developed and applied. In this regard, space management efficiency and control performance are being improved through a by-wire vehicle chassis system.

In this trend, vehicle steering systems are also changing. For example, research and development on Steer-by-Wire (SbW), an electric signal type intelligent steering system that transmits electrical signal indicating driver's will to steer without a mechanical connection between a steering wheel operated by the driver and the vehicle's wheels, is actively developed. However, such a system may have a problem in which the driver has no means to manipulate steering in the event of a failure such as a communication failure.

(Patent document) Korean Patent Registration No. 10-1229126, "Steering Control System of Steer-by-Wire System", registered on Jan. 28, 2013.

SUMMARY

Some embodiments of the present disclosure are directed to providing an apparatus and method for estimating a steering angle based on differential braking so that steering force may be assisted through differential braking of a vehicle in case of a failure of the vehicle steering system, and a non-transitory computer-readable storage medium storing a program for performing the method.

Certain embodiments of the present disclosure are directed to providing an apparatus and method for estimating a steering angle based on differential braking to accurately estimate a steering angle of a front wheel according to differential braking when the front wheel of the vehicle is in a free-rolling state, and a non-transitory computer-readable storage medium storing a program for performing the method.

The objects of the present disclosure are not limited to the above-described objects, and other objects that are not mentioned will be able to be clearly understood by those skilled in the art to which the present disclosure pertains from the following description.

According to an aspect of the present disclosure, provided is an apparatus for estimating a steering angle based on differential braking, the apparatus including: a memory configured to store an estimation model that has at least one coefficient and defines the relationship between a differential braking force of a vehicle and a steering angle of the vehicle's free-rolling front wheels; and a processor configured to input test data comprising a plurality of differential braking forces and a steering angle generated when each differential braking force is applied to the estimation model, and determine the coefficient of the estimation model.

In the apparatus for estimating a steering angle based on differential braking according to an aspect of the present disclosure, the differential braking force may be determined by a difference between a left front wheel brake pressure of the vehicle and a right front wheel brake pressure of the vehicle.

In the apparatus for estimating a steering angle based on differential braking according to an aspect of the present disclosure, the estimation model is represented by the following Mathematical Formula 1 and may have $J_\delta$, $b_\delta$, and $k_\delta$ as the coefficients:

$$J_\delta \delta_f'' + b_\delta \delta_f' + k_\delta \delta_f = \frac{w}{2}\left(F_b^{FL} - F_b^{FR}\right) \qquad \text{(Mathematical Formula 1)}$$

($\delta_f''$: front wheel steering angular acceleration, $\delta_f'$: front wheel steering angular velocity, $\delta_f$: front wheel steering angle, $F_b^{FL}$: left front wheel brake pressure, $F_b^{FR}$: right front wheel brake pressure, W: vehicle's wheel track).

In the apparatus for estimating a steering angle based on differential braking according to an aspect of the present disclosure, the test data may include different n (n is a natural number greater than or equal to 3) differential braking forces and a steering angle generated when each differential braking force is applied, and the processor may determine $J_\delta$, $b_\delta$, and $k_\delta$ using the following Mathematical Formula 2:

$$\begin{pmatrix} \delta_{f1}'' & \delta_{f1}' & \delta_{f1} \\ \delta_{f2}'' & \delta_{f2}' & \delta_{f2} \\ \vdots & \vdots & \vdots \\ \delta_{fn}'' & \delta_{fn}' & \delta_{fn} \end{pmatrix} \begin{pmatrix} J_\delta \\ b_\delta \\ k_\delta \end{pmatrix} = \begin{pmatrix} \frac{w}{2}\left(F_b^{FL} - F_b^{FR}\right)_1 \\ \frac{w}{2}\left(F_b^{FL} - F_b^{FR}\right)_2 \\ \vdots \\ \frac{w}{2}\left(F_b^{FL} - F_b^{FR}\right)_n \end{pmatrix} \qquad \text{(Mathematical Formula 2)}$$

In the apparatus for estimating a steering angle based on differential braking according to an aspect of the present disclosure, the processor may determine $J_\delta$, $b_\delta$, and $k_\delta$ through the least square method.

In the apparatus for estimating a steering angle based on differential braking according to an aspect of the present disclosure, the speed of the vehicle may be divided into a plurality of speed sections, and the coefficient of the estimation model may be determined for each of the plurality of speed sections.

In the apparatus for estimating a steering angle based on differential braking according to an aspect of the present disclosure, the size of the speed section may be set to 10 km/h.

In the apparatus for estimating a steering angle based on differential braking according to an aspect of the present disclosure, the maximum value among a plurality of different differential braking forces included in the test data may be set to 60 bar or less.

In the apparatus for estimating a steering angle based on differential braking according to an aspect of the present disclosure, all of the test data may be obtained in a state in which a scrub radius of the vehicle is set to be positive.

In the apparatus for estimating a steering angle based on differential braking according to an aspect of the present disclosure, all of the test data may be obtained in a state in which a scrub radius of the vehicle is set to be negative.

According to another aspect of the present disclosure, provided is a method for estimating a steering angle based on differential braking, the method including: storing, by a memory, an estimation model that has at least one coefficient and defines the relationship between a differential braking force of a vehicle and a steering angle of the vehicle's free-rolling front wheels; and inputting, by a processor, test data comprising a plurality of differential braking forces and a steering angle generated when each differential braking force is applied to the estimation model, and determining the coefficient of the estimation model.

In the method for estimating a steering angle based on differential braking according to another aspect of the present disclosure, the differential braking force may be determined by a difference between a left front wheel brake pressure of the vehicle and a right front wheel brake pressure of the vehicle.

In the method for estimating a steering angle based on differential braking according to another aspect of the present disclosure, the estimation model is represented by the following Mathematical Formula 1 and may have $J_\delta$, $b_\delta$, and $k_\delta$ as the coefficients:

$$J_\delta \delta_f'' + b_\delta \delta_f' + k_\delta \delta_f = \frac{w}{2}\left(F_b^{FL} - F_b^{FR}\right) \qquad \text{(Mathematical Formula 1)}$$

($\delta_f''$: front wheel steering angular acceleration, $\delta_f'$: front wheel steering angular velocity, $\delta_f$: front wheel steering angle, $F_b^{FL}$: left front wheel brake pressure, $F_b^{FR}$: right front wheel brake pressure, W: vehicle's wheel track).

In the method for estimating a steering angle based on differential braking according to another aspect of the present disclosure, the test data may include different n (n is a natural number greater than or equal to 3) differential braking forces and a steering angle generated when each differential braking force is applied, and in the determining the coefficient of the estimation model, the processor may determine $J_\delta$, $b_\delta$, and $k_\delta$ using the following Mathematical Formula 2:

$$\begin{pmatrix} \delta_{f1}'' & \delta_{f1}' & \delta_{f1} \\ \delta_{f2}'' & \delta_{f2}' & \delta_{f2} \\ \vdots & \vdots & \vdots \\ \delta_{fn}'' & \delta_{fn}' & \delta_{fn} \end{pmatrix}\begin{pmatrix} J_\delta \\ b_\delta \\ k_\delta \end{pmatrix} = \begin{pmatrix} \frac{w}{2}\left(F_b^{FL} - F_b^{FR}\right)_1 \\ \frac{w}{2}\left(F_b^{FL} - F_b^{FR}\right)_2 \\ \vdots \\ \frac{w}{2}\left(F_b^{FL} - F_b^{FR}\right)_n \end{pmatrix} \qquad \text{(Mathematical Formula 2)}$$

4

In the method for estimating a steering angle based on differential braking according to another aspect of the present disclosure, the processor may determine $J_\delta$, $b_\delta$, and $k_\delta$ through the least square method.

In the method for estimating a steering angle based on differential braking according to another aspect of the present disclosure, the speed of the vehicle may be divided into a plurality of speed sections, and the coefficient of the estimation model may be determined for each of the plurality of speed sections.

In the apparatus for estimating a steering angle based on differential braking according to another aspect of the present disclosure, the size of the speed section may be set to 10 km/h.

In the method for estimating a steering angle based on differential braking according to another aspect of the present disclosure, the maximum value among a plurality of different differential braking forces included in the test data may be set to 60 bar or less.

In the method for estimating a steering angle based on differential braking according to another aspect of the present disclosure, all of the test data may be obtained in a state in which a scrub radius of the vehicle is set to be positive or all of the test data may be obtained in a state in which the scrub radius of the vehicle is set to be negative.

According to yet another aspect of the present disclosure, provided is a non-transitory computer-readable storage medium having stored thereon a program including at least one instruction for performing the method for estimating a steering angle based on differential braking according to another aspect of the present disclosure.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 5 is a graph showing an example of a result of estimating, by an apparatus for estimating a steering angle based on differential braking according to an exemplary embodiment of the present disclosure, a steering angle based on test data obtained according to the test condition of FIG. 4;

FIG. 6 is graphs showing another example of a test condition related to the acquisition of test data to be input to an apparatus for estimating a steering angle based on differential braking according to an exemplary embodiment of the present disclosure;

DETAILED DESCRIPTION OF EXEMPLARY EMBODIMENTS

Figure 1:
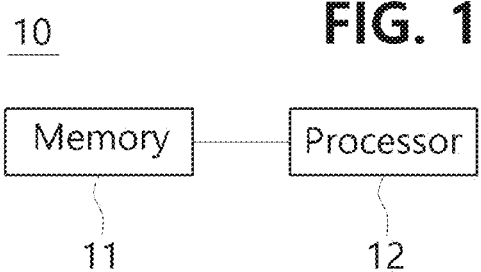
FIG. 1 is a block diagram showing a configuration of an apparatus for estimating a steering angle based on differential braking according to an exemplary embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

Figure 2:
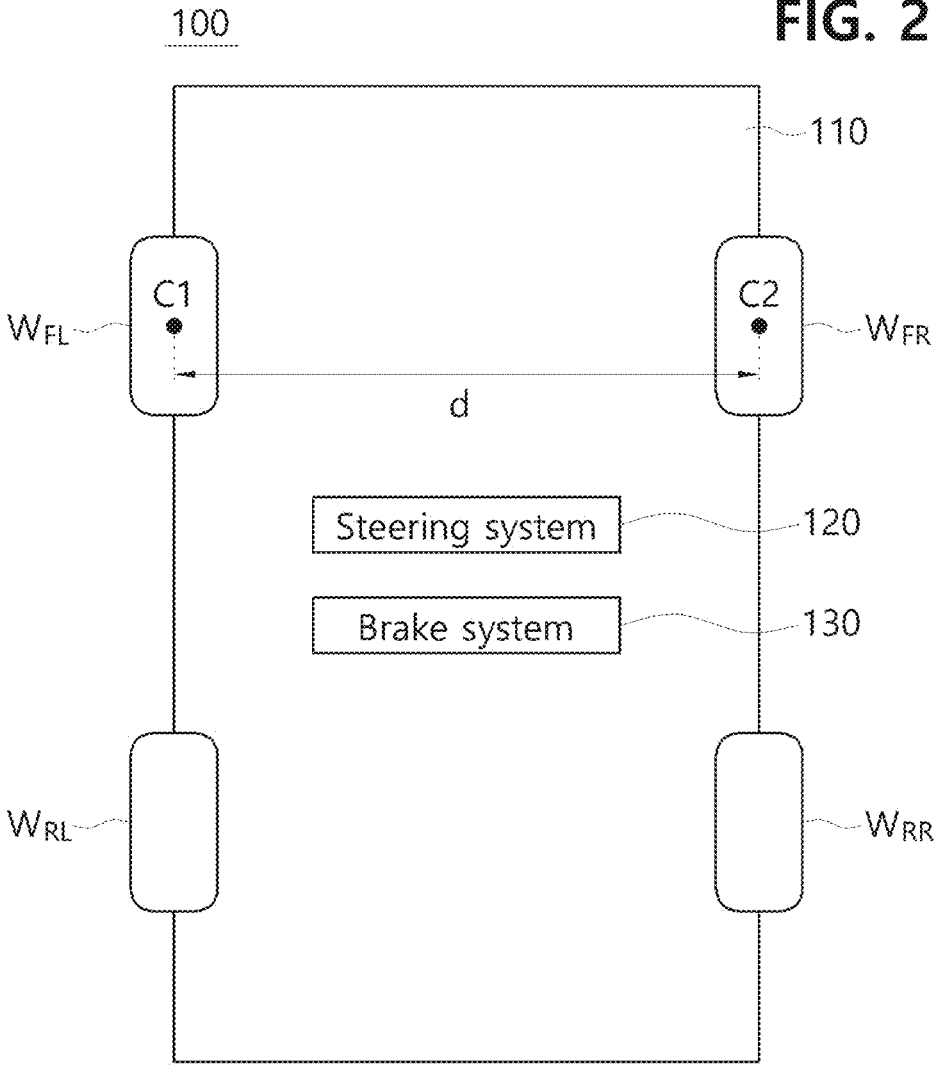
FIG. 2 is a conceptual diagram showing a vehicle configuration in which a steering angle according to differential braking can be estimated by an apparatus for estimating a steering angle based on differential braking according to an exemplary embodiment of the present disclosure.

FIG. 1 is a block diagram showing a configuration of an apparatus for estimating a steering angle based on differential braking according to an exemplary embodiment of the present disclosure. FIG. 2 is a conceptual diagram showing a vehicle configuration in which a steering angle according to differential braking can be estimated by an apparatus for estimating a steering angle based on differential braking according to an exemplary embodiment of the present disclosure.

An apparatus 10 for estimating a steering angle based on differential braking according to an exemplary embodiment of the present disclosure may estimate a steering angle during differential braking of a vehicle 100 using an estimation model that defines a change in the steering angle according to the differential braking force when the vehicle 100 is driven, and test data obtained to be input to the estimation model.

Referring to FIG. 1, the apparatus 10 for estimating the steering angle based on differential braking according to an exemplary embodiment of the present disclosure may include a memory 11 and a processor 12.

The memory 11 stores the estimation model. The estimation model has at least one coefficient and defines the relationship between the differential braking force of the vehicle 100 and the steering angle of the free-rolling front wheels of the vehicle 100.

The memory 11 may include, for example, but not limited to, at least one of semiconductor device-based storage media such as RAM, ROM, and flash memory, magnetic media such as hard disks, floppy disks and magnetic tapes, optical recording media such as compact disk read only memory (CD-ROM), digital video disk (DVD), and magneto-optical media such as floptical disks. Of course, the memory 11 may have any hardware configuration capable of storing data, instructions, and information.

Referring to FIG. 2, the vehicle 100 includes a vehicle body 110, a left front wheel $W_{FL}$, a right front wheel $W_{FR}$, a left rear wheel $W_{RL}$, and a right rear wheel $W_{RR}$ rotatably connected to the vehicle body 110. In addition, the vehicle 100 may include a steering system 120. For example, the steering system 120 may be configured as a steer-by-wire system. Of course, the type of steering system 120 is not limited to a steer-by-wire system, and, for instance, the steering system 120 may be configured as an electric power steering (EPS) in which auxiliary steering force is provided by a motor.

While the vehicle 100 is driving, the front wheels may be in a free-rolling state. That is, the left front wheel $W_{FL}$ and the right front wheel $W_{FR}$ may be in a free-rolling state while the vehicle 100 is driving. For example, when a failure occurs in the steering system 120 of the vehicle 100 and the steering according to the driver's steering wheel operation of the vehicle 100 cannot be performed appropriately, the left front wheel $W_{FL}$ and the right front wheel $W_{FR}$ may be in a free-rolling state.

When the left front wheel $W_{FL}$ and the right front wheel $W_{FR}$ of the vehicle 100 are in a free-rolling state, when differential braking is applied to the vehicle 100, a front wheel steering angle is generated between the wheel (e.g. a tire included in the wheel) of the vehicle 100 and the ground or road. In this regard, the vehicle 100 may include a brake system 130 configured to perform differential braking control capable of generating different braking forces of the left front wheel $W_{FL}$ and the right front wheel $W_{FR}$.

When the left front wheel $W_{FL}$ and the right front wheel $W_{FR}$ of the vehicle 100 are in a free-rolling state due to a failure in the steering system 120 of the vehicle 100, a complete loss of steering force or steering control of the vehicle 100 may be prevented when appropriate differential braking control of the brake system 130 is performed based on steering wheel operation information of the driver of the vehicle 100. In other words, when the left front wheel $W_{FL}$ and the right front wheel $W_{FR}$ of the vehicle 100 are in a free-rolling state, the steering through differential braking control may be performed.

In relation to such differential braking-based steering, the estimation model defines a change in a front wheel steering angle according to differential braking force. Here, the differential braking force may be determined by a difference between the brake pressure of the left front wheel $W_{FL}$ of the vehicle 100 and the brake pressure of the right front wheel $W_{FR}$ of the vehicle 100.

The estimation model may represent a change in front wheel steering angle according to differential braking force as a second-order system model. In an embodiment of the present disclosure, the estimation model is configured with (Mathematical Formula 1) and may have $J_\delta$, $b_\delta$, and $k_\delta$ as the coefficients:

$$J_\delta \delta_f'' + b_\delta \delta_f' + k_\delta \delta_f = \frac{w}{2}\left(F_b^{FL} - F_b^{FR}\right) \qquad \text{(Mathematical Formula 1)}$$

7

($\delta_f''$: front wheel steering angular acceleration, $\delta_f'$: front wheel steering angular velocity, $\delta_f$: front wheel steering angle, $F_b^{FL}$: left front wheel brake pressure, $F_b^{FR}$: right front wheel brake pressure, W: a wheel track of the vehicle).

In the estimation model, the wheel track W of the vehicle means the distance between wheels of the vehicle. More specifically, the wheel track W of the vehicle means the distance between the left front wheel $W_{FL}$ and the right front wheel $W_{FR}$ of the vehicle 100. The distance between the left front wheel $W_{FL}$ and the right front wheel $W_{FR}$ may be defined as a distance d between the center C1 of the left front wheel $W_{FL}$ and the center C2 of the right front wheel $W_{FR}$. For instance, the center C1 of the left front wheel $W_{FL}$ and the center C2 of the right front wheel $W_{FR}$ may be determined based on a tire.

In the estimation model, the left front wheel brake pressure $F_b^{FL}$ refers to a longitudinal force applied to the left front wheel $W_{FL}$ due to differential braking. The left front wheel brake pressure $F_b^{FL}$ may be calculated based on a torque factor according to an effective radius for the brake pressure applied to the left front wheel $W_{FL}$ of the vehicle 100.

The right front wheel brake pressure $F_b^{FR}$ refers to a longitudinal force applied to the right front wheel $W_{FR}$ due to differential braking. The right front wheel brake pressure $F_b^{FR}$ may be calculated based on a torque factor according to an effective radius for the brake pressure applied to the right front wheel $W_{FR}$ of the vehicle 100.

In the estimation model, the front wheel steering angular velocity $\delta_f'$ may be obtained by differentiating the front wheel steering angle $\delta_f$. In addition, the front wheel steering angular acceleration $\delta_f''$ may be obtained by differentiating the front wheel steering angular velocity $\delta_f'$.

The processor 12 inputs test data including a plurality of differential braking forces and steering angles generated when differential braking forces are applied to the estimation model, respectively, and determines the coefficient of the estimation model.

The processor 12 may be a hardware unit that performs calculation and control in a computer. For example, the processor 12 may include at least one arithmetic logic unit (ALU) and a processing register.

Once the coefficients $J_\delta$, $b_\delta$, and $k_\delta$ of the estimation model are determined, the steering angle given a random differential braking force can be calculated through the estimation model. Looking at it from another perspective, when the front wheels ($W_{FL}$, $W_{FR}$) of the vehicle 100 are in a free-rolling state, the differential braking force required to obtain the desired steering angle may be derived through the estimation model.

The coefficients $J_\delta$, $b_\delta$, and $k_\delta$ of the estimation model may be estimated based on test data for the vehicle. More specifically, the coefficients $J_\delta$, $b_\delta$, and $k_\delta$ of the estimation model may be determined through front wheel steering angle test data according to differential braking forces obtained under various conditions.

The test data includes a plurality of different differential braking forces and steering angles generated when differential braking forces are applied, respectively. That is, the test data may include a plurality of different differential braking forces applied to the vehicle 100 and steering angles generated in the front wheel of the vehicle in a free-rolling state when the differential braking forces are given, respectively.

For example, the test data may be obtained through a test designed based on simulation software and a model-based design platform, and the like. More specifically, the test data may be obtained by driving the vehicle 100 according to a designed test logic or scenario.

In this case, control input information and state information of the vehicle 100, including differential braking force and a steering angle, may be acquired in real time through communication with the steering system 120 or the brake system 130 of the vehicle. For example, the communication may be performed in a controller area network flexible data-rate (CANFD) method.

Meanwhile, if the steering system 120 is an EPS type system, the steering angle may be obtained through a steering angle sensor (SAS) of the steering system 120. In addition, if the steering system 120 is a steer-by-wire type system, the steering angle may be obtained based on information related to a position of a driving mechanism (e.g., a rack) that provides steering force to the wheels of the vehicle.

In an embodiment of the present disclosure, the test data includes different n differential braking forces (n is a natural number greater than or equal to 3) and steering angles generated when the n differential braking forces are applied, respectively, and the processor 12 may determine $J_\delta$, $b_\delta$, and $k_\delta$ using the following Mathematical Formula 2.

$$\begin{pmatrix} \delta_{f1}'' & \delta_{f1}' & \delta_{f1} \\ \delta_{f2}'' & \delta_{f2}' & \delta_{f2} \\ \vdots & \vdots & \vdots \\ \delta_{fn}'' & \delta_{fn}' & \delta_{fn} \end{pmatrix} \begin{pmatrix} J_\delta \\ b_\delta \\ k_\delta \end{pmatrix} = \begin{pmatrix} \frac{w}{2}\left(F_b^{FL} - F_b^{FR}\right)_1 \\ \frac{w}{2}\left(F_b^{FL} - F_b^{FR}\right)_2 \\ \vdots \\ \frac{w}{2}\left(F_b^{FL} - F_b^{FR}\right)_n \end{pmatrix} \quad \text{(Mathematical Formula 2)}$$

In Mathematical Formula 2 above, when a matrix consisting of front wheel steering angle acceleration, front wheel steering angular velocity, and front wheel steering angle obtained from the test data is A, a matrix consisting of the coefficients $J_\delta$, $b_\delta$, and $k_\delta$ of the estimation model is x, and a vector matrix on the left side of Mathematical Formula 2 related to differential braking force is B, x may be expressed as Mathematical Formula 3 below.

$$x = \left(A^T A\right)^{-1} A^T B \quad \text{(Mathematical Formula 3)}$$

The processor 12 may determine $J_\delta$, $b_\delta$, and $k_\delta$ through regression analysis. For example, the processor 12 may determine $J_\delta$, $b_\delta$, and $k_\delta$ through a least square method.

When the $i^{th}$ row of matrix A (i is a natural number greater than or equal to 1 and less than or equal to n) is referred to as $A_i$, and the $i^{th}$ row of matrix B is referred to as $B_i$, the processor 12 may obtain a vector matrix x that can minimizes a value calculated by the following Mathematical Formula 4.

$$\sum_{i=1}^{n} \left(B_i - A_i x\right)^2 \quad \text{(Mathematical Formula 4)}$$

The coefficients of the estimation model may be different for each speed section of the vehicle 100. That is, the estimation model may be determined differently for each speed section of the vehicle 100. Therefore, the speed of the vehicle 100 may be divided into a plurality of speed sections, and the coefficient of the estimation model may be determined for each of the plurality of speed sections. For example, the size of the speed section may be set to 10 km/h.

Meanwhile, the front wheel steering angle generated when differential braking is applied while the front wheel of the vehicle 100 is in a free-rolling state is related to the scrub radius. Meanwhile, the front wheel steering angle generated when differential braking is applied while the front wheel of the vehicle 100 is in a free-rolling state may have a different aspect depending on whether the scrub radius is positive or negative.

Figure 3:
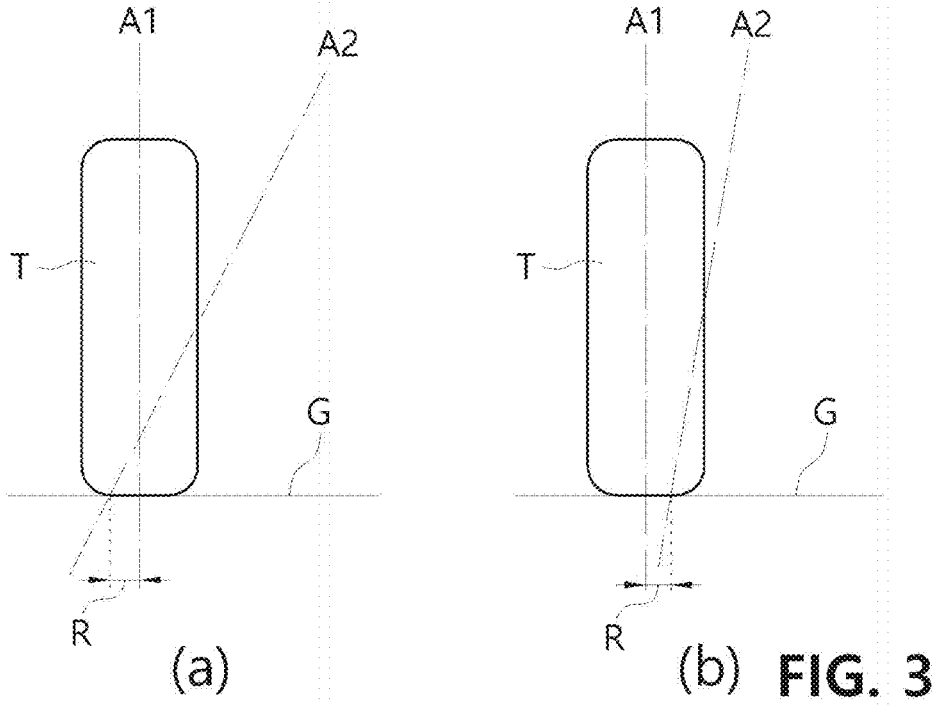
FIG. 3 is a diagram for describing a scrub radius in relation to an apparatus for estimating a steering angle based on differential braking according to an exemplary embodiment of the present disclosure.

FIG. 3 is a conceptual diagram for describing a scrub radius in relation to an apparatus for estimating a steering angle based on differential braking according to an exemplary embodiment of the present disclosure. Referring to FIG. 3, the scrub radius R is defined as a distance between a point where the vertical center line A1 of a tire T of the vehicle's wheel and a road surface G intersect each other and a point where the center line A2 of a kingpin of the vehicle and the road surface G intersect each other.

In this case, if the intersection point between the vertical center line A1 of the tire T and the center line A2 of the kingpin is located above the road surface G, the scrub radius R has a negative value as illustrated in FIG. 3(a). If the intersection point between the vertical center line A1 of the tire T and the center line A2 of the kingpin is located below the road surface G, the scrub radius R has a positive value as shown in FIG. 3(b).

Hereinafter, with regard to the acquisition of test data, the scrub radius R may be set to a positive value or a negative value. In this case, if it is difficult to adjust the kingpin inclination of the vehicle due to hardware limitations of the test vehicle, the kingpin offset (lateral offset at center) of the test vehicle may be adjusted. A spacer may be used to adjust the kingpin offset of the test vehicle.

Figure 4:
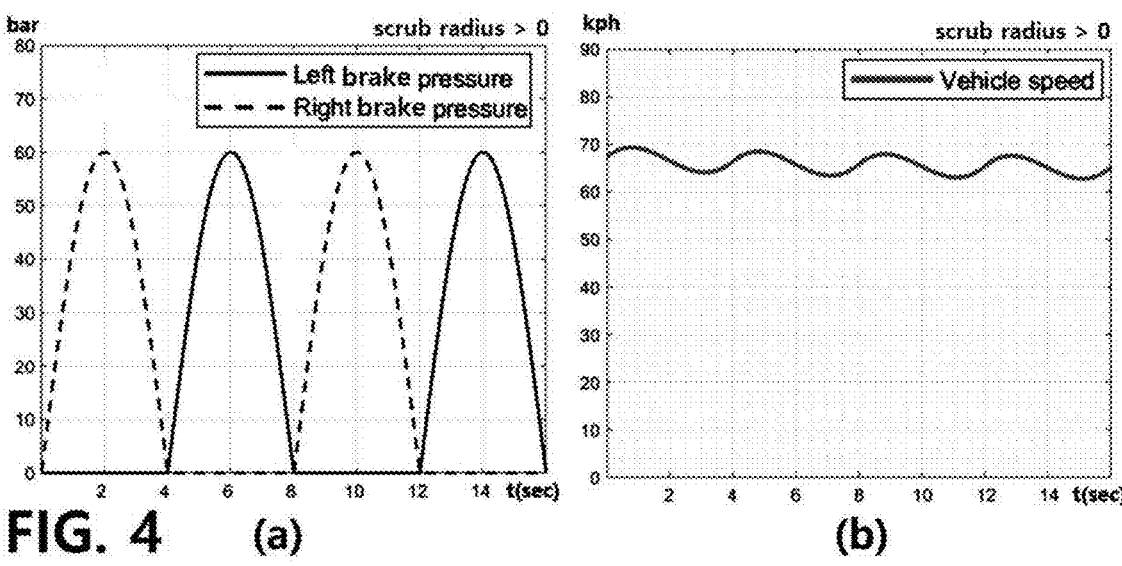
FIG. 4 is graphs showing an example of a test condition related to the acquisition of test data to be input to an apparatus for estimating a steering angle based on differential braking according to an exemplary embodiment of the present disclosure.

FIG. 4 is graphs showing an example of a test condition related to the acquisition of test data to be input to an apparatus for estimating a steering angle based on differential braking according to an exemplary embodiment of the present disclosure. FIG. 4 shows a test condition for obtaining test data including a steering angle according to differential braking of a vehicle in which the scrub radius of the vehicle is set to be greater than 0, i.e., a positive value.

Referring to FIG. 4, in an embodiment of the present disclosure, all of the test data may be obtained in a state in which the scrub radius of the vehicle 100 is set as a positive value.

Referring to FIG. 4(a), the differential braking input may limit the driver's operation and a repetitive test may be performed based on a sine waveform. In this case, the maximum value of a plurality of different differential braking forces included in the test data may be set to 60 bar or less. That is, the front and rear wheel maximum brake pressure may be fixed up to about 60 bar, which is a level at which no slip occurs, and when converted into torque, the front wheel may be about 2520 Nm and the rear wheel may be about 1272 Nm.

As an example, it may be considered to perform four tests of 4 seconds and 8 seconds cycles twice for each right brake pressure and left brake pressure, which are directions in which differential braking is applied. In addition, it may be considered that at least two to three cycles are performed for each test. In addition, the value may be extracted in units of 0.01 seconds.

Referring to FIG. 4(b), the speed section of the vehicle is set to 60 to 70 km/h. In this case, the cruise control function may be activated so that the vehicle to be tested can maintain the corresponding speed. In addition, the repeated tests as described in relation to FIG. 4(a) may be performed for a plurality of speed sections other than the speed section shown in FIG. 4(b).

FIG. 5 is a graph showing a result of estimating, by an apparatus for estimating a steering angle based on differential braking according to an exemplary embodiment of the present disclosure, a steering angle based on test data obtained according to the test condition of FIG. 4.

Referring to FIG. 5, when using an estimation model to which the estimated coefficients are applied for a 60-70 km/h speed section of a vehicle in which the scrub radius is set to be positive, it can be confirmed that the estimated value of the steering angle (e.g. an estimated wheel angle) according to the differential braking estimated by the estimation model well follows the measured value of the steering angle (e.g. a measured wheel angle) according to the actual measured differential braking.

For example, in an embodiment of the present disclosure, the coefficients $J_\delta$, $b_\delta$, and $k_\delta$ of the estimation model may be determined to be 54750, 7087, and 377981, respectively, for a 60-70 km/h speed section of a vehicle in which the scrub radius is set to positive. Of course, this is exemplary, and the values of the coefficients may vary depending on the type of vehicle, etc.

FIG. 6 is graphs showing another example of a test condition related to the acquisition of test data to be input to an apparatus for estimating a steering angle based on differential braking according to an exemplary embodiment of the present disclosure. FIG. 6 shows a test condition for obtaining test data including a steering angle according to differential braking of a vehicle in which the scrub radius of the vehicle is set to be smaller than 0, i.e., a negative value.

Referring to FIG. 6, in an embodiment of the present disclosure, all of the test data may be obtained in a state in which the scrub radius of the vehicle 100 is set to be negative.

Referring to FIG. 6(a), the differential braking input may limit the driver's operation and a repetitive test may be performed based on a sine waveform. In this case, the maximum value of a plurality of different differential braking forces included in the test data may be set to 60 bar or less. That is, the front and rear wheel maximum brake pressure may be fixed up to about 60 bar, which is a level at which no slip occurs, and when converted into torque, the front wheel may be about 2520 Nm and the rear wheel may be about 1272 Nm.

As an example, it may be considered to perform four tests of 4 seconds and 8 seconds cycles twice for each right brake pressure and left brake pressure, which are directions in which differential braking is applied. In addition, it may be considered that at least two to three cycles are performed for each test. In addition, the value may be extracted in units of 0.01 seconds.

Referring to FIG. 6(b), the speed section of the vehicle is set to 60 to 70 km/h. In this case, the cruise control function may be activated so that the vehicle to be tested can maintain the corresponding speed. In addition, the repeated tests as described in relation to FIG. 4(a) may be performed for a plurality of speed sections other than the speed section shown in FIG. 4(b).

Figure 7:
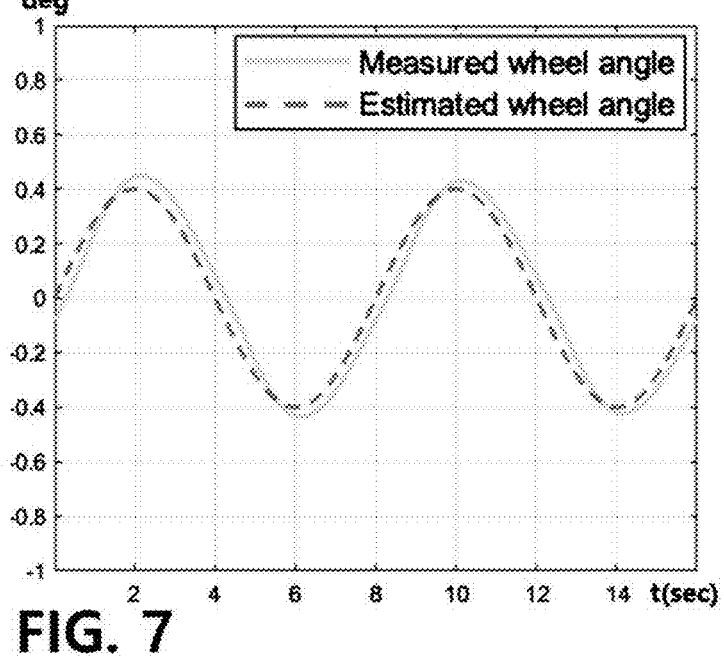
FIG. 7 is a graph showing an example of a result of estimating, by an apparatus for estimating a steering angle based on differential braking according to an exemplary embodiment of the present disclosure, a steering angle based on test data obtained according to the test condition of FIG. 6.

FIG. 7 is a graph showing a result of estimating, by an apparatus for estimating a steering angle based on differential braking according to an exemplary embodiment of the present disclosure, a steering angle based on test data obtained according to the test condition of FIG. 6.

Referring to FIG. 7, when using an estimation model to which the estimated coefficients are applied for a 60-70 km/h speed section of a vehicle in which the scrub radius is set to be negative, it can be confirmed that the estimated value of the steering angle (e.g. an estimated wheel angle) according to the differential braking estimated by the estimation model well follows the measured value of the steering angle (e.g. a measured wheel angle) according to the actual measured differential braking.

For example, in an embodiment of the present disclosure, the coefficients $J_\delta$, $b_\delta$, and $k_\delta$ of the estimation model may be determined to be −46698, −89501, and −396572, respectively, for a 60-70 km/h speed section of a vehicle in which the scrub radius is set to be negative. Of course, this is exemplary, and the value of the specific coefficient may vary depending on the type of vehicle, etc.

The apparatus 10 for estimating a steering angle based on differential braking according to an exemplary embodiment of the present disclosure has been described above in detail. Hereinafter, a method for estimating a steering angle based on differential braking according to an exemplary embodiment of the present disclosure will be described.

Figure 8:
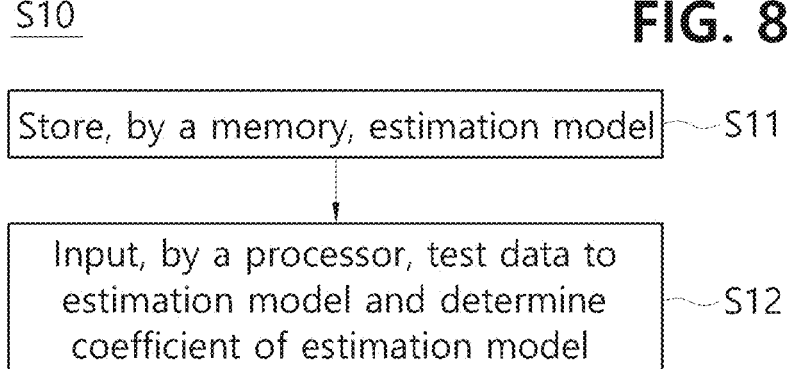
FIG. 8 is a flowchart of a method for estimating a steering angle based on differential braking according to an exemplary embodiment of the present disclosure.

FIG. 8 is a flowchart of a method for estimating a steering angle based on differential braking according to an exemplary embodiment of the present disclosure.

A method S10 for estimating a steering angle based on differential braking according to an exemplary embodiment of the present disclosure may be performed by the apparatus 10 for estimating a steering angle based on differential braking according to an exemplary embodiment of the present disclosure. Referring to FIG. 8, the method S10 for estimating a steering angle based on differential braking according to an exemplary embodiment of the present disclosure may be performed as follows.

First, the memory 11 stores an estimation model that has at least one coefficient and defines the relationship between the differential braking force of the vehicle and the steering angle of the free-rolling front wheels of the vehicle (step S11). The estimation model may have at least one coefficient and define the relationship between the differential braking force of the vehicle 100 and the steering angle of the free-rolling front wheels of the vehicle 100.

The estimation model is implemented by the following Mathematical Formula 1 and may have $J_\delta$, $b_\delta$, and $k_\delta$ as the coefficients.

$$J_\delta \delta''_f + b_\delta \delta'_f + k_\delta \delta_f = \frac{w}{2}\left(F_b^{FL} - F_b^{FR}\right) \qquad \text{(Mathematical Formula 1)}$$

($\delta''_f$: front wheel steering angular acceleration, $\delta'_f$: front wheel steering angular velocity, $\delta_f$: front wheel steering angle, $F_b^{FL}$: left front wheel brake pressure, $F_b^{FR}$: right front wheel brake pressure, W: wheel track of the vehicle).

The variables and coefficients of the estimation model included in Mathematical Formula 1 are the same as described in relation to those of the apparatus 10 for estimating a steering angle based on differential braking according to an exemplary embodiment of the present disclosure. Therefore, detailed descriptions thereof will be omitted.

Next, the processor 12 inputs test data including a plurality of differential braking forces and steering angles generated when differential braking forces are applied to the estimation model, respectively, and determines the coefficient of the estimation model (step S12). The processor 12 may estimate a steering angle during the differential braking of the vehicle 100 using test data obtained to be input to the estimation model.

Once the coefficients $J_\delta$, $b_\delta$, and $k_\delta$ of the estimation model are determined, the steering angle given a random differential braking force can be calculated through the estimation model. Looking at it from another perspective, when the front wheels ($W_{FL}$, $W_{FR}$) of the vehicle 100 are in a free-rolling state, the differential braking force required to obtain the desired steering angle may be derived through the estimation model.

The coefficients $J_\delta$, $b_\delta$, and $k_\delta$ of the estimation model may be estimated based on test data for the vehicle. More specifically, the coefficients $J_\delta$, $b_\delta$, and $k_\delta$ of the estimation model may be determined through front wheel steering angle test data according to differential braking forces obtained under various conditions.

The test data includes different n differential braking forces (n is a natural number greater than or equal to 3) and steering angles generated when differential braking forces are applied, respectively, and the processor 12 may determine $J_\delta$, $b_\delta$, and $k_\delta$ using the following Mathematical Formula 2.

$$\begin{pmatrix} \delta''_{f1} & \delta'_{f1} & \delta_{f1} \\ \delta''_{f2} & \delta'_{f2} & \delta_{f2} \\ \vdots & \vdots & \vdots \\ \delta''_{fn} & \delta'_{fn} & \delta_{fn} \end{pmatrix} \begin{pmatrix} J_\delta \\ b_\delta \\ k_\delta \end{pmatrix} = \begin{pmatrix} \frac{w}{2}\left(F_b^{FL} - F_b^{FR}\right)_1 \\ \frac{w}{2}\left(F_b^{FL} - F_b^{FR}\right)_2 \\ \vdots \\ \frac{w}{2}\left(F_b^{FL} - F_b^{FR}\right)_n \end{pmatrix} \qquad \text{(Mathematical Formula 2)}$$

In Mathematical Formula 2 above, when a matrix consisting of front wheel steering angle acceleration, front wheel steering angular velocity, and front wheel steering angle obtained from the test data is A, a matrix consisting of the coefficients $J_\delta$, $b_\delta$, and $k_\delta$ of the estimation model is x, and a vector matrix on the left side of Mathematical Formula 2 related to differential braking force is B, x may be expressed as Mathematical Formula 3 below.

$$x = \left(A^T A\right)^{-1} A^T B \qquad \text{(Mathematical Formula 3)}$$

In addition, the processor 12 may determine $J_\delta$, $b_\delta$, and $k_\delta$ through regression analysis. For example, the processor 12 may determine $J_\delta$, $b_\delta$, and $k_\delta$ through a least square method.

When the $i^{th}$ row of matrix A (i is a natural number greater than or equal to 1 and less than or equal to n) is referred to as $A_i$, and the $i^{th}$ row of matrix B is referred to as $B_i$, the processor 12 may obtain an x that minimizes the following Mathematical Formula 4.

$$\sum_{i=1}^{n}\left(B_i - A_i x\right)^2 \qquad \text{(Mathematical Formula 4)}$$

In this case, the speed of the vehicle may be divided into a plurality of speed sections, and the coefficient of the estimation model may be determined for each of the plurality of speed sections. For example, the size of the speed section may be set to 10 km/h.

In addition, the maximum value of a plurality of different differential braking forces included in the test data may be set to 60 bar or less. That is, the maximum brake pressure of the front and rear wheels may be fixed up to about 60 bar, which is a level at which no slip occurs.

In addition, all of the test data may be obtained in a state in which the scrub radius of the vehicle is set to be positive or all of the test data may be obtained in a state in which the scrub radius of the vehicle is set to be negative.

In addition, in the acquisition of the test data and determination of the estimation model, the contents described in relation to the apparatus 10 for estimating a steering angle based on differential braking according to an exemplary embodiment of the present disclosure may be applied as it is to the method S10 for estimating a steering angle based on differential braking according to an exemplary embodiment of the present disclosure.

Meanwhile, the present disclosure additionally provides a non-transitory computer-readable storage medium having stored thereon a program for performing the method for estimating a steering angle based on differential braking is stored. Specifically, the present disclosure may provide a non-transitory computer-readable storage medium having stored thereon a program including at least one instruction for performing the method for estimating a steering angle based on differential braking.

In this case, the instruction may include not only machine code generated by a compiler but also higher level language code executable by a computer. In addition, the storage medium may include a hardware device configured to store and perform program instructions such as a hard disk, a magnetic medium such as a floppy disk and a magnetic tape, an optical medium such as a compact disk read only memory (CD-ROM) and a digital video disk (DVD), a magneto-optical medium such as a floptical disk, a read-only memory (ROM), a random access memory (RAM), a flash memory, and the like.

When the coefficients of the estimation model are determined according to an embodiment of the present disclosure, an estimation model having the determined coefficients may be mounted in the ECU of the vehicle. When the wheel of such a vehicle is in a free-rolling state, the driver's will to steer the vehicle may be identified based on operation information on the steering wheel, and differential braking control may be performed to obtain the steering angle desired by the driver using the estimation model.

In addition, according to some embodiments of the present disclosure, it may not be necessary to install an additional sensor for differential braking control of the vehicle. Accordingly, it is possible to efficiently improve the fail-over performance of a steering system.

In addition, certain embodiments of the present disclosure can improve the fail-over performance of a steering system (such as steer-by-wire type steering system) that has no physical connection between the steering wheel and wheels of the vehicle by operating only with electrical signals.

According to the above configuration, the apparatus and method for estimating a steering angle based on differential braking, and the non-transitory computer-readable storage medium storing a program for performing the method according to an aspect of the present disclosure may provide an estimated value of a steering angle according to differential braking so that the steering of the vehicle can be assisted through the differential braking when the steering system of the vehicle fails.

The apparatus and method for estimating a steering angle based on differential braking, and the non-transitory computer-readable storage medium storing a program for performing the method according to an aspect of the present disclosure may provide an accurate estimated value of a steering angle of a front wheel according to differential braking when the front wheel of the vehicle is in a free-rolling state.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. An apparatus comprising:
a memory configured to store an estimation model having at least one coefficient and defining correlation between a differential braking force of a vehicle and a steering angle of free-rolling front wheels of the vehicle; and
a processor configured to input test data comprising a plurality of differential braking forces and steering angles generated when the plurality of differential braking forces are applied to the estimation model, respectively, and determine the at least one coefficient of the estimation model to estimate the steering angle based on the differential braking.

2. The apparatus of claim 1, wherein the processor is configured to determine the differential braking force based on a difference between a left front wheel brake pressure and a right front wheel brake pressure.

3. The apparatus of claim 1,
wherein the at least one coefficient of the estimation model comprises $J_\delta$, $b_\delta$, and $k_\delta$, and the estimation model uses Mathematical Formula 1:

$$J_\delta \delta_f'' + b_\delta \delta_f' + k_\delta \delta_f = \frac{w}{2}\left(F_b^{FL} - F_b^{FR}\right) \qquad \text{(Mathematical Formula 1)}$$

$\delta_f''$: a front wheel steering angular acceleration, $\delta_f'$: a front wheel steering angular velocity, $\delta_f$: a front wheel steering angle, $F_b^{FL}$: a left front wheel brake pressure, $F_b^{FR}$: a right front wheel brake pressure, W: a wheel track of the vehicle).

4. The apparatus of claim 3,
wherein the test data comprises n differential braking forces (n is a natural number greater than or equal to 3) and steering angles generated when the n differential braking forces are applied to the estimation model, respectively, and the processor is configured to determine $J_\delta$, $b_\delta$, and $k_\delta$ using Mathematical Formula 2:

$$\begin{pmatrix} \delta_{f1}'' & \delta_{f1}' & \delta_{f1} \\ \delta_{f2}'' & \delta_{f2}' & \delta_{f2} \\ \vdots & \vdots & \vdots \\ \delta_{fn}'' & \delta_{fn}' & \delta_{fn} \end{pmatrix}\begin{pmatrix} J_\delta \\ b_\delta \\ k_\delta \end{pmatrix} = \begin{pmatrix} \frac{w}{2}\left(F_b^{FL} - F_b^{FR}\right)_1 \\ \frac{w}{2}\left(F_b^{FL} - F_b^{FR}\right)_2 \\ \vdots \\ \frac{w}{2}\left(F_b^{FL} - F_b^{FR}\right)_n \end{pmatrix} \qquad \text{(Mathematical Formula 2)}$$

5. The apparatus of claim 4, wherein the processor is configured to determine $J_\delta$, $b_\delta$, $k_\delta$ through a least square method.

6. The apparatus of claim 1, wherein the processor is configured to determine the at least one coefficient of the estimation model for each of a plurality of speed sections of the vehicle.

7. The apparatus of claim 1, wherein a maximum value of the plurality of different differential braking forces included in the test data is set to 60 bar or less.

8. The apparatus of claim 1, wherein the test data is obtained in a state in which a scrub radius of the vehicle is set to be positive.

9. The apparatus of claim 1, wherein the test data is obtained in a state in which a scrub radius of the vehicle is set to be negative.

10. A computerized method comprising:

storing, by a memory, an estimation model having at least one coefficient and defining correlation between a differential braking force of a vehicle and a steering angle of free-rolling front wheels of the vehicle; and inputting, by a processor, test data comprising a plurality of differential braking forces and steering angles generated when the plurality of differential braking forces are applied to the estimation model, respectively, and determining, by the processor, the at least one coefficient of the estimation model to estimate the steering angle based on the differential braking.

11. The computerized method of claim 10, wherein the differential braking force is determined by a difference between a left front wheel brake pressure and a right front wheel brake pressure.

12. The method of claim 10, wherein the at least one coefficient of the estimation model comprises $J_\delta$, $b_\delta$, and $k_\delta$, and the estimation model uses Mathematical Formula 3:

$$J_\delta \delta_f'' + b_\delta \delta_f' + k_\delta \delta_f = \frac{w}{2}\left(F_b^{FL} - F_b^{FR}\right) \qquad \text{(Mathematical Formula 3)}$$

($\delta_f''$: a front wheel steering angular acceleration, $\delta_f'$: a front wheel steering angular velocity, $\delta_f$: a front wheel steering angle, $F_b^{FL}$: a left front wheel brake pressure, $F_b^{FR}$: a right front wheel brake pressure, W: a wheel track of the vehicle).

13. The computerized method of claim 12, wherein the test data comprises n differential braking forces (n is a natural number greater than or equal to 3) and steering angles generated when the n differential braking force are applied to the estimation model, respectively, and the determining of the coefficient of the estimation model comprises determining $J_\delta$, $b_\delta$, $k_\delta$ and using Mathematical Formula 4:

$$\begin{pmatrix} \delta_{f1}'' & \delta_{f1}' & \delta_{f1} \\ \delta_{f2}'' & \delta_{f2}' & \delta_{f2} \\ \vdots & \vdots & \vdots \\ \delta_{fn}'' & \delta_{fn}' & \delta_{fn} \end{pmatrix} \begin{pmatrix} J_\delta \\ b_\delta \\ k_\delta \end{pmatrix} = \begin{pmatrix} \frac{w}{2}\left(F_b^{FL} - F_b^{FR}\right)_1 \\ \frac{w}{2}\left(F_b^{FL} - F_b^{FR}\right)_2 \\ \vdots \\ \frac{w}{2}\left(F_b^{FL} - F_b^{FR}\right)_n \end{pmatrix}. \qquad \text{(Mathematical Formula 4)}$$

14. The computerized method of claim 13, wherein the processor determines $J_\delta$, $b_\delta$, $k_\delta$ through a least square method.

15. The computerized method of claim 10, wherein the at least one coefficient of the estimation model is determined for each of a plurality of speed sections of the vehicle.

16. The computerized method of claim 10, wherein a maximum value of the plurality of different differential braking forces included in the test data is set to 60 bar or less.

17. A non-transitory computer-readable medium configured to store instructions that when executed by a processor, cause the processor to perform operations comprising:

storing an estimation model having at least one coefficient and defining correlation between a differential braking force of a vehicle and a steering angle of free-rolling front wheels of the vehicle; and inputting test data comprising a plurality of differential braking forces and steering angles generated when the plurality of differential braking forces are applied to the estimation model, respectively, and determining the at least one coefficient of the estimation model to estimate the steering angle based on the differential braking.

* * * * *